(12) United States Patent
Robbins et al.

(10) Patent No.: US 7,718,187 B2
(45) Date of Patent: May 18, 2010

(54) SUPPLEMENT FOR MAINTAINING RUMEN HEALTH IN RUMINANTS

(75) Inventors: Mark A. Robbins, Sturgis, SD (US); Kenneth Swanson, Mankato, MN (US)

(73) Assignee: Ridley Block Operations, Inc., Mankato, MN (US)

( * ) Notice: Subject to any disclaimer, the term of this patent is extended or adjusted under 35 U.S.C. 154(b) by 253 days.

(21) Appl. No.: 10/421,295

(22) Filed: Apr. 23, 2003

(65) Prior Publication Data

US 2004/0009209 A1  Jan. 15, 2004

Related U.S. Application Data

(60) Provisional application No. 60/393,171, filed on Jul. 2, 2002.

(51) Int. Cl.
*A23K 1/18* (2006.01)
(52) U.S. Cl. .................. 424/438; 119/174; 424/484; 424/715; 424/717; 426/2; 426/74; 426/807
(58) Field of Classification Search ................... None
See application file for complete search history.

(56) References Cited

U.S. PATENT DOCUMENTS

| | | | | |
|---|---|---|---|---|
| 3,532,503 | A * | 10/1970 | Kviesitis | 426/546 |
| 4,631,192 | A * | 12/1986 | Mommer et al. | 426/69 |
| 4,729,896 | A * | 3/1988 | Sawhill | 426/2 |
| 4,735,809 | A * | 4/1988 | Donovan et al. | 426/69 |
| 5,264,227 | A * | 11/1993 | Laroche et al. | 426/72 |
| 6,244,217 | B1 | 6/2001 | Robbins | |
| 6,440,478 | B1 * | 8/2002 | Benton et al. | 426/471 |
| 7,143,720 | B2 * | 12/2006 | Robbins | 119/174 |

OTHER PUBLICATIONS

Derwent Acc-No. 1993-377935, 1993.*
"ZENOAQ has newly marketed Solid Salts containing peptide minerals" Press Release, Nippon Zenuaku Kogyo Co., Ltd., Jul. 24, 2002 (3pgs).
Erdman, Richard A., "Dietary Buffering Requirements of the Lactating Dairy Cow: A Review", *Journal of Diary Science*, vol. 71, No. 12, 1998, pp. 3246-3267.
Owens, Fred et al., "A New Look at Acidosis [1,2]", *Proceedings of the 11th Annual Southwest Nutrition & Management Conference*, Feb. 1996 (20pgs).
Footbio P, Alkalix P, Bovilix P, Product Information, http://www.zenoaq.jp/html_e/Sh01.html, Jul. 2002, (1pg).
Dan Dhuyvetter, "Block Feeding Innovations and Applications", AFIA Liquid Feed Meeting 2001, Ridley Block Operations, Mankato, Minnesota.
Jim Drouillard, "Block Supplements", p. 88-89, Liquid Feed Symposium 1998, Kansas State University, Manhattan Kansas.

* cited by examiner

*Primary Examiner*—Neil Levy
(74) *Attorney, Agent, or Firm*—Dorsey & Whitney LLP

(57) ABSTRACT

The present invention includes a method of maintaining rumen health in ruminants. The method includes providing to a ruminant a low-moisture block made of molasses and having a buffer. The low-moisture buffer block is specifically designed such that licking rather than chewing consumes the block. The licking action of the cows increases salivation, which acts as a natural buffer for the maintenance of the overall rumen health.

7 Claims, 5 Drawing Sheets

SUPPLEMENT FOR MAINTAINING RUMEN HEALTH IN RUMINANTS

CROSS-REFERENCE TO RELATED APPLICATION(S)

Figure 1:
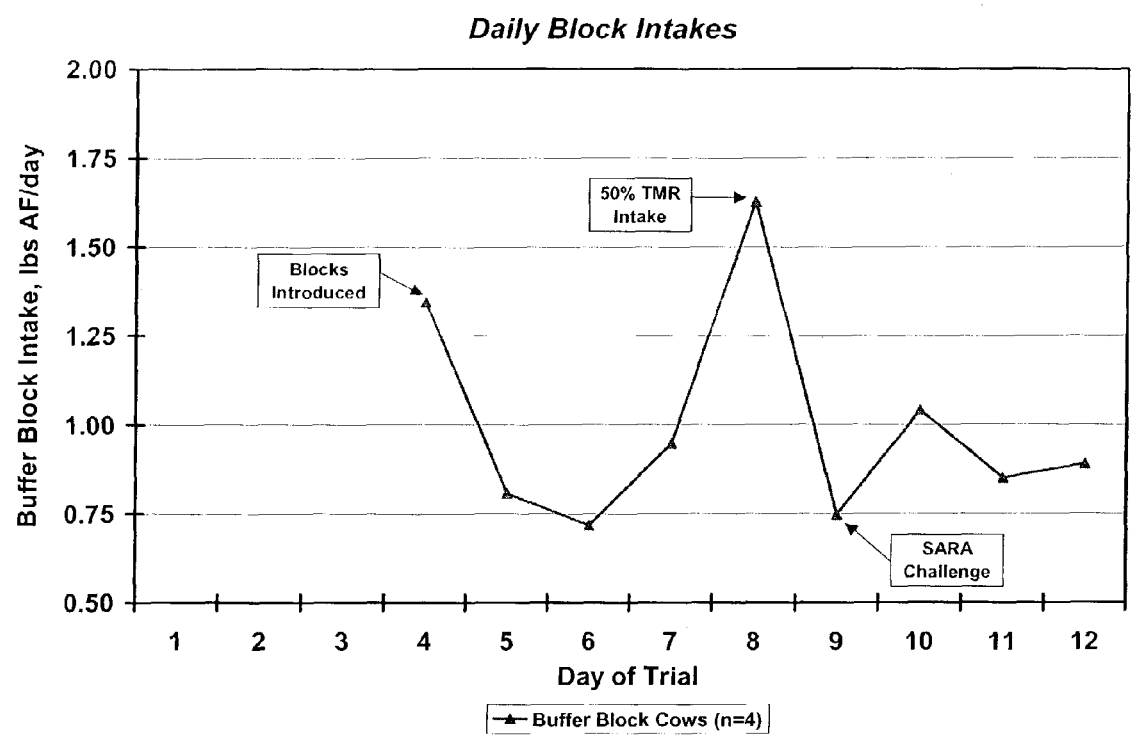

This application claims priority from U.S. Provisional Patent Application No. 60/393,171, filed Jul. 2, 2002, which is hereby incorporated by reference in its entirety.

FIELD OF THE INVENTION

The present invention relates to a system and method for maintaining rumen health in ruminants and thereby increasing feed intake, feed efficiency, or production of milk, meat, or other animal products, and alleviating metabolic disorders associated with ruminal acidosis, feed intake interruptions, or over-consumption of feed.

BACKGROUND OF THE INVENTION

Efficient rumen fermentation in ruminants is important to maximizing feed intake, feed efficiency, production of milk, meat, or other animal products, and maintaining acceptable levels of milk components. A healthy rumen environment reduces the risk and incidence of metabolic disorders that can occur with improper feeding management or abrupt feed intake changes, such as acidosis.

Current cattle industry practices incorporate the genetic selection of certain characteristics such as feed efficiency or maximized milk production. Genetic selection can result in animals that gain weight efficiently and/or produce large volumes of high quality milk. Genetically selected cattle are fed energy dense rations to maximize milk production. Energy dense rations can inhibit fiber fermentation and increase the difficulty of maintaining an optimal rumen environment. The feeding of high concentrate diets for cattle has increased awareness of problems associated with ruminal acidosis and the implications it has on feed consumption, feed efficiency, production of milk, meat, or other animal products, and animal health.

Current practices also include self-feeding for certain animals, which may include finishing beef and finishing dairy beef cattle. Self-fed nutrition management programs provide all or part of an animal's complete diet in feeder equipment that allows free access for the animal to this diet at all times of the day over the entire feeding period. Self-feeding often occurs in dry lot environments, but can occur in other environments as well. Typically, self-fed programs are designed for feeding beef and dairy cattle to the appropriate weight and fatness level whereby the resulting meat satisfies the standards of the meat industry. Self-fed programs can also be provided at any time during the growing and development periods for animals to achieve their desired weight and maturity. Because animals lack the nutritional wisdom to regulate their feed consumption to optimize health, growth, and beneficial rumen microbial growth, acute and subacute digestive disorders can result in these self-fed environments.

A substantial drop in ruminal pH can damage the rumen wall, decrease blood pH, cause dehydration, laminitis, or erratic feed consumption patterns, and severely depress feed intake and feed efficiency. During acidosis and the recovery period, females may also experience decreased milk production. Maintaining a healthy rumen pH and preventing disorders such as acidosis can therefore improve feed intake, feed efficiency, productive milk output, milk quality indices, and feedlot animal performance, including meat production.

One form of acidosis, subacute ruminal acidosis (SARA), is likely the most economically important disorder of dairy cattle in the United States. Economic losses due to SARA result from decreased feed intake, erratic feed consumption, decreased feed efficiencies, decreased milk production, decreased efficiency of milk production, premature culling, reduced animal health, and increased death loss. Severely affected herds commonly encounter extreme financial difficulties and often are forced to exit the beef or dairy industries.

SARA is defined as periods of moderately depressed ruminal pH (about 5.0 to 5.5) that are between acute and chronic in duration. The most consistent and immediate clinical sign of SARA is depressed feed intake. This is a normal, physiological effort by the animal to restore its ruminal pH to 5.5 or greater by reducing the supply of carbohydrates available for fermentation in the rumen. Fibrolytic bacteria are inhibited during periods of depressed ruminal pH, which decreases digestive efficiency. These factors combine to reduce such vital production variables as feed efficiency, milk yield, profitability, and impair animal comfort and health.

Health problems due to SARA may follow an initial drop in feed intake, weight gain, milk production and milk production efficiency. Clinical signs from SARA are delayed in onset from the time of the low ruminal pH insult. These signs are the result of a pathophysiological cascade of events that begins with rumenitis. Once the ruminal epithelium is inflamed, bacteria may colonize the papillae and leak into portal circulation. These bacteria may cause liver abscesses, which sometimes cause peritonitis around the site of the abscess. If the ruminal bacteria clear the liver (or if bacteria from liver infections are released into circulation), they may colonize in the lungs, heart valves, kidneys, or joints. The resulting pneumonia, endocarditis, pyelonephritis, and arthritis are all chronic inflammatory diseases that are difficult to diagnose ante-mortem. SARA may also be associated with laminitis and subsequent hoof overgrowth, sole abscesses, and sole ulcers. These foot problems generally do not appear until weeks or months after the bout of ruminal acidosis that caused them. Herds affected with SARA typically have high involuntary cull rates and high death losses.

Lactate accumulates transiently in the rumen of animals affected with SARA. This lactate is eventually absorbed as lactic acid or converted to less harmful organic acids. However, any lactate accumulation in ruminal fluid is undesirable because it has the potential to dramatically lower ruminal pH due to the very low pKa of lactate (3.9) compared to acetate, propionate, and butyrate (pKa of about 4.8).

Thus, there is a need in the art for a system and method for maintaining rumen health, including improving ruminal pH, in ruminants.

BRIEF SUMMARY OF THE INVENTION

The present invention, according to one embodiment, relates to a method of maintaining a healthy rumen in ruminant animals. The method includes providing a low-moisture product to the ruminant in which the low-moisture product has a buffer and is consumed by licking.

In an alternative aspect, the present invention is a method of preventing or reducing ruminal acidosis in a ruminant. The method includes providing to the ruminant a low-moisture product having a buffer and allowing the ruminant to lick the low-moisture product at any time.

In another embodiment, the present invention relates to a feed supplement for maintaining rumen health in a ruminant. The supplement includes a low-moisture product configured to be available to the ruminant at any time. The low-moisture product of the supplement has a buffer.

The present invention, in another embodiment, relates to a package formulation for maintaining rumen health in a ruminant. The package formulation includes a low-moisture product having a buffer and moisture barrier packaging enclosing the low-moisture product.

DETAILED DESCRIPTION

The present invention includes a system of providing a low-moisture block for consumption by ruminants to maintain rumen health in the animals by stimulating salivation and providing a buffer agent in the block. The increased licking action stimulated by the low-moisture block increases the animal's natural saliva production, thereby increasing the animal's natural buffering of the rumen environment while the buffer further buffers the rumen.

A low-moisture block is a dehydrated feed product. While the written description herein refers only to a low-moisture "block," it may be appreciated that the teachings of the present invention may be utilized in further low-moisture products that take other forms. For example, in one embodiment the invention has a barrel shape. Alternatively, the feed product is a small block. The small block may be anywhere from 2 ounces to 4 pounds. Alternatively, the small block may be anywhere from 40 pounds to sixty pounds. In accordance with one embodiment, the small block is any known size suitable for an individual animal or a small number of animals.

The low-moisture block of the present invention is formed by subjecting the desired base ingredient or ingredients to a heating process that causes dehydration. The base ingredient comprises from about 30 percent to about 70 percent by weight of the low-moisture block. In one embodiment, the base ingredient is molasses taffy. The molasses taffy becomes viscous as moisture is removed. Alternatively, the base ingredient is cane or beet molasses. In a further alternative, the base ingredient is concentrated separator byproduct ("CSB") or soluble molasses solids ("SMS"). The base ingredient may be any ingredient providing carbohydrate moieties that contribute to the low-moisture block's physical properties.

The low-moisture block according to one embodiment of the present invention includes additional liquid ingredients blended into the base ingredient prior to dehydration. The block in accordance with one aspect of the invention includes a fat comprising from about 0 percent to about 25 percent by weight of the low-moisture block. The fat may be hydrolyzed vegetable oil, tallow, choice white grease, yellow grease, soap stock, or poultry fat. Alternatively, the fat may be any known fat capable of being consumed by animals. Further liquid ingredients may include delactosed permeate, whey permeates, corn sweetener byproducts. Alternatively, further liquid ingredients include any known ingredients with functional sugar moieties.

Once dehydration is complete, a buffer is added to the base ingredient and blended. The term "buffer" as used herein is intended to include any ingredient or compound added to neutralize excess acidity. Buffer can be added to the block at a concentration of from about 5.0 percent to about 60 percent of the block by weight. Alternatively, buffer is added at a concentration of from about 20 percent to about 50 percent of the block by weight. In a further alternative, buffer is added at a concentration of from about 35 percent to about 45 percent of the block by weight.

A buffer according to one embodiment includes any buffering agent that maintains the acidity level of an environment within a narrow range regardless of whether acidic or basic additives are added to the environment. For example, the buffer in accordance with one embodiment is sodium bicarbonate. Alternatively, the buffer is sodium sesquicarbonate. In a further alternative, the buffer is potassium carbonate, calcium carbonate, or magnesium carbonate. The buffer may also be any combination of these buffering agents.

A buffer of the present invention also includes any alkalinizing agent (also called an "alkalinizer") that raises the pH in direct proportion to the amount of alkalinizer added. The alkalinizing agent added to the low-moisture block according to one embodiment of the present invention is magnesium oxide. Alternatively, the alkalinizing agent is magnesium hydroxide.

The buffer in accordance with one embodiment of the present invention is any combination of buffering agents and/or alkalinizing agents. Alternatively, the buffer may be any known acid-neutralizing compound that can be safely ingested by animals. Various amounts of buffer can be added to various types of low-moisture blocks without deviating from the nature and scope of the present invention.

Additional dry ingredients are added after dehydration in one aspect of the present invention. The block may have CSB comprising from about 0 percent to about 60 percent by weight of the low-moisture block. Alternatively, the block includes a vitamin/mineral premix comprising from about 0 percent to about 7.5 percent by weight of the low-moisture block. In an additional alternative, the block includes an organic trace mineral premix comprising from about 0 percent to about 5.0 percent by weight of the low-moisture block. Further dry ingredients, according to one aspect of the invention, can also be blended into the base ingredient at this time.

As the blended product cools, it solidifies into its final form. The low-moisture block is hygroscopic. That is, the exposed portions of the block readily take up and retain moisture. In use, exposure of a portion of a low-moisture block to the air causes the block to take up moisture from the air as well as saliva from an animal's licking action and become softer than the unexposed portions of the block beneath the exterior surface. The soft portion of the block can be consumed by licking. Because of its hardness, only that portion of the block that is exposed to the atmosphere softens and can be consumed. The slow softening of the block is primarily what regulates animal intake, i.e., makes intake self-limiting.

According to one embodiment, the block, once it cools, is sealed at the surface in some manner from exposure to the air to prevent the softening described above. The block may be packaged in any manner that prevents the block from taking up moisture at the surface by creating a moisture barrier at the surface (referred to herein as "moisture barrier packaging"). According to one embodiment, the low-moisture block is packaged in a steel container wherein the moisture barrier packaging consists of a removable plastic sheet covering the open top of the container. Alternatively, the moisture barrier packaging is airtight packaging. In a further alternative, the moisture barrier packaging is any known product for providing a moisture barrier at the surface of the low-moisture block. For example, the moisture barrier packaging may be a hard plastic container or shrink-wrapping.

The block enclosed in the moisture barrier packaging may be further placed in additional packaging. The additional packaging in accordance with one embodiment also serves as a moisture barrier. The additional or external packaging is, in one embodiment, a fiber container. For example, the external packaging may be cardboard. Alternatively, the additional packaging may be biodegradable and/or edible. Alternatively, the external packaging is a plastic container, large bulk packaging, or smaller individual animal/stall packaging. In a further alternative, the external packaging is any known container for packaging a product. In one embodiment, the external packaging is completely removed from the product before use.

According to one aspect of the present invention, instructions for using the low-moisture buffer block are included with the product. The instructions are enclosed within the moisture barrier packaging. Alternatively, the instructions are placed in the external packaging. In another aspect of the invention, the instructions are affixed in some manner to the product, the moisture barrier packaging, or the external packaging.

The instructions for use, according to one embodiment, including instructions regarding the placement of the product in an appropriate location for access by a ruminant or ruminants. The instructions may state that a portion of the moisture barrier packaging should be removed so that the product is only partially exposed. For example, the instructions may state that a plastic lid should be removed. The instructions may also state that the product should be placed in a location easily accessible for consumption by the ruminant or ruminants. Alternatively, the instructions state that the product should be placed in a location proximal to the ruminant's feeding location. In a further alternative, the instructions state that the product should be placed in a certain location to initiate animal movement within a defined space. The instructions provide any known instructions for placement of a supplemental feed product for ruminants.

In one aspect of the present invention, a low-moisture block containing buffer as described herein is provided to ruminants. Alternatively, the ruminants are provided with a low-moisture block containing no buffer additive. In use, the ruminants lick the buffer-less block and the increased licking action increases the animal's saliva production. Saliva performs a natural buffering action, thus increasing the animal's natural buffering of the rumen environment.

Other types of low-moisture blocks with buffer may also be utilized in the present invention, including, but not limited to, hybrid blocks that use all or part of low-moisture block manufacturing technologies. According to one embodiment, a block of the present invention may be made with a degree of mechanical pressure or chemical reactions to harden the block or assist in its formation.

According to one embodiment, the buffer is added to low-moisture blocks of the present invention to help increase dietary cation-anion difference (DCAD). The DCAD can be an important dietary characteristic during periods of heat stress and helps to maintain rumen health.

As can be seen in the examples below, consumption of some portion of a low-moisture block of the present invention on a daily basis can impact an animal's health and metabolic functions, including improved health, increased feed intake, improved feed efficiency, or increased production of milk, meat, or other animal products. More specifically, consumption of the low-moisture buffer block of the present invention can maintain rumen health, including improving rumen health, or maintaining an already healthy rumen. Further, consumption of the low-moisture block of the present invention can prevent or significantly reduce periods of SARA.

According to one embodiment, low-moisture blocks of the present invention are provided to ruminant animals fed for meat production. For example, the low-moisture blocks may be provided to beef cattle. For example, the low-moisture blocks may be used for starting and maintaining cattle on feed, as well as later in the finishing period when cattle are fed extremely high concentrate levels with very little roughage. The low-moisture buffer block can also be beneficial in buffering the rumen during step-up periods when ration changes are being made, and when beef cattle are on their final ration formulations that contain the highest levels of rapidly fermentable carbohydrate and the lowest levels of roughage.

In a further embodiment, the low-moisture blocks are provided to ruminant animals fed for meat production or breeding females that are placed on self-fed complete diets from free-choice feeders. Providing low-moisture blocks of the present invention to free-choice fed ruminant animals can help in reducing acute and sub-acute ruminal acidosis, occurrences of bloat due to rapidly fermentable carbohydrate that is irregularly consumed, maintaining cattle on feed, reducing digestive morbidity and mortality, and other problems associated with free-choice feeding methods.

The present invention, according to one embodiment, is a system of feeding cattle that includes providing to the cattle both a low-moisture buffer block and a buffer supplement that is included in the cattle's loose feed. The buffer may be added to the daily ration in total (including buffer provided in the block and in the loose feed) at a rate of about 2 to 12 ounces per head per day. Alternatively, the buffer is added in total at a rate of about 4 to 10 ounces per head per day. In a further alternative, the buffer is added in total at a rate of about 6 to 8 ounces per head per day.

The examples below are illustrated in terms of dairy cattle, but the teachings of the present invention may be utilized in other ruminant animals as well, including, but not limited to, beef or dairy finishing cattle, sheep, or goats.

EXAMPLE 1

Materials and Methods

The below described trial (Study I) was conducted during the months of April to October in 2000 at VanderWal Brothers Dairy, in Slayton, Minn. There were 206 cows in the study split into a control group and a treatment group. Primiparous cows represented 106 of the cows and were split equally into the control group and the treatment group. Multiparous cows represented the remaining 100 cows and were also split equally into the control group and the treatment group. As cows calved, they were alternatively assigned into either the control group or the treatment group. Cows that were approaching the end of their lactation, and approaching the dry off period, were removed from the pens. Cows stayed in one treatment group from April through August (unless the cows calved).

The animals were kept on a diet that met or exceeded National Research Council specifications. Diets included corn silage, haylage, hay, dry corn, distiller's dried grains, whole cottonseed, and a protein, mineral and vitamin mix.

Low-moisture blocks with a combination of sodium bicarbonate and magnesium oxide were supplemented free choice to cattle in the treatment group. The sodium bicarbonate was added to the block at a concentration of 686 pounds per ton. The magnesium oxide was added at a concentration of 64 pounds per ton. The low-moisture blocks in the experiment were placed in one-half steel barrels, weighed approximately 250 pounds each, and were made available for consumption by the cows of the treatment group at all times. Low-moisture block intake was determined by weighing the barrels before and after they were in the pen and dividing the amount consumed by the number of days until the barrel was empty. By taking into account the number of cows that had access to the barrels, the amount of block consumed by each cow could be determined.

Cows were fed once a day starting at approximately 9:00 am. Cows were milked three times a day and those that met the dairy's criteria were administered bovine somatotropin (BST), a known growth hormone for cattle. Sodium bicarbonate was also included in the loose feed ration at 6 to 8 ounces per head per day for both groups of cattle. Daily dry matter intakes were measured for each pen using the EZ Feed® system. Individual cow milk weights, 3.5% fat corrected milk (FCM), milk fat percent, and milk protein percent were determined monthly using the Dairy Herd Improvement Association (DHIA) test.

Statistics were analyzed using repeated measures analysis of SAS.® SAS is a statistical analysis software system that uses covariate analysis to correct when cows were removed from the study as well as to determine treatment effects.

Results

Low-moisture block intake averaged 9.18 ounces per day for the primiparous cows and 7.17 ounces per day for multiparous cows. No clear reason was evident for the difference in consumption rate between primiparous and multiparous cows. With the given rate of the added buffer in the block, primiparous cows consumed an additional 3.15 ounces of sodium bicarbonate per day and multiparous cows consumed an additional 2.46 ounces of sodium bicarbonate per day. This does not include the added sodium bicarbonate buffer, which they received from the diet supplement in their ration at 6-8 ounces per head per day.

Data collected during the study are summarized in the table below. In the table, M represents multiparous, P represents primiparous, C represents control, and T represents treatment. $P_1$ represents the level of significance (P value) for parity effect, $P_2$ represents the level of significance (P value) for diet effect, and $P_3$ represents the level of significance (P value) for parity by diet interaction.

In Study I, cows that were on trial for at least three months from May through August were used in the analyses. Covariate analysis was used for cows that were not on trial in April but were on trial for at least three months.

Not to be limited by theory, it is thought that the increased licking combined with the buffer helps to maintain the rumen health by buffering the rumen and reducing the occurrence of acidosis. Maintaining the rumen may have the greatest effect in counteracting the heat stress that occurred during the time period of study I. In other words, the reduction in milk production during months of intense heat may be counteracted with the addition of the low-moisture blocks to the cows' diet. Cows that are in a heat stress situation may benefit from the added buffer in the diet, the additional dietary cation/anion balance from extra potassium or sodium formulated in the block, or increased licking which produces natural buffering action from the additional saliva production. Furthermore, it was noted that the treatment had the greatest effect on the multiparous cows, increasing the milk production during study I from 74.1 lbs to 83.3 lbs.

EXAMPLE 2

Methods and Materials

Experimental Cows and Protocol: Eight ruminally cannulated lactating dairy cows were evaluated in two groups of four cows each in June 2002. All cows were in their first lactation and thus were all primiparous. Cows were paired by stage of lactation (early or late) within group. Treatments were assigned randomly within pair.

The study was conducted at US Dairy Forage Research Center in Prairie du Sac, Wis. It was approved and overseen by the University of Wisconsin-Madison Research Animal Resource Center and School of Veterinary Medicine Animal Care and Use Committee.

Cows were housed in individual tie stalls equipped to continuously monitor ruminal pH using indwelling pH electrodes and a computer-based data acquisition system. Ruminal pH was measured continuously and recorded as one-minute averages. Electrodes were calibrated twice weekly using pH 4 and 7 buffers and validated once weekly by comparing the pH reading from the data acquisition system to the reading from

TABLE 1

Study I Milk Data
(least square means are reported)

| | Parity | | | Diet | | | M | | P | | |
|---|---|---|---|---|---|---|---|---|---|---|---|
| Item | M | P | $P_1=$ | C | T | $P_2=$ | C | T | C | T | $P_3=$ |
| Milk, lbs | 78.8[b] | 89.7[a] | .0001 | 81.7[b] | 86.8[a] | .03 | 74.1[c] | 83.3[b] | 89.3[a] | 90.2[a] | .07 |
| 3.5% FCM, lbs | 82.7[b] | 93.4[a] | .0001 | 85.1[b] | 91.1[a] | .04 | 77.8 | 87.7 | 92.4 | 94.5 | .16 |
| Fat, % | 3.82 | 3.80 | .83 | 3.78 | 3.84 | .58 | 3.81 | 3.83 | 3.75 | 3.81 | .74 |
| Protein, % | 2.97 | 2.99 | .35 | 2.99 | 2.97 | .30 | 2.98 | 2.95 | 3.00 | 2.98 | .96 |
| Fat, lbs | 3.02[b] | 3.36[a] | .01 | 3.09[b] | 3.30[a] | .09 | 2.85 | 3.20 | 3.32 | 3.40 | .27 |
| Protein, lbs | 2.32 | 2.67 | .0001 | 2.47 | 2.56 | .04 | 2.19[c] | 2.45[b] | 2.66[a] | 2.68[a] | .06 |

[abc]Means with different superscripts differ <0.10.
$P_1$ = P value for parity effect.
$P_2$ = P value for diet effect.
$P_3$ = P value for parity by diet interaction.

Multiparous cows for Study I in the treatment group milked 9.2 lbs more than those in the control group. This same trend was not observed in primiparous cows. For both parities combined, 3.5% FCM was higher for treatment cows than control cows by 6 lbs. Higher fat yields (3.30 vs. 3.09 lbs) were in the treatment cows as compared to the control cows.

CONCLUSIONS

Data reveal that there is a benefit of utilizing a buffer additive with low-moisture blocks for lactating dairy cattle.

a pH electrode placed next to the indwelling electrode in the rumen and connected to a hand-held pH meter.

Wooden feed mangers designed to hold a full day's amount of totally mixed ration (TMR) were suspended in front of each cow. Hanging electronic load cells were included in the apparatus used to suspend the mangers. The weight of the feed manger was transmitted from the load cells to a second data acquisition system (separate from the ruminal pH data acquisition system). Feed manger weights were measured continuously and recorded as one-minute averages. The load cells were calibrated at the start of each group using three known weights representing the range of expected TMR weights.

Weights of the buffer blocks consumed by the treated cows were also measured continuously and recorded once each minute using the second data acquisition system. The buffer blocks provided by the manufacturer were broken into pieces by hand and melted at 60 degrees C. into rectangular metal pans about 15 cm wide, 23 cm long, and 6 cm deep. The blocks were allowed to re-harden after removal from the oven. The metal pans containing the blocks were mounted on platform load cells, and the entire buffer block assembly was protected inside a three-sided wooden box placed next to the feed manger in front of the treated cows. The platform load cells were calibrated at the start of each group using three known weights representing the range of expected buffer block weights.

Cows were managed according to standard protocols at the US Dairy Forage Research Center. Cows past the ninth week of lactation were injected once every 14 days with rbST (Posilac®). Cows were fed their TMR once daily at approximately 0730 and milked twice daily in a milking parlor at approximately 0530 and 1730.

Cows were disconnected from the ruminal pH data acquisition system during milking. Milk yield from each milking was recorded using automatic weigh meters in the milking parlor. Milk samples were collected during each milking throughout the trial and were analyzed for fat and protein content.

Chemical composition of the alfalfa haylage, corn silage, and high moisture shelled corn used in the diets was determined by wet chemistry procedures prior to the start of the trial. The dry matter content of these wet feeds was checked three times weekly and diets adjusted accordingly, so that the TMR offered contained the same proportion of each ingredient on a dry matter basis. Total feeding amounts were adjusted daily so that cows were truly fed ad libitum, with >10% daily feed refusal. Samples of the TMR offered and any subsequent feed refusals by the animals ("orts") were collected three times weekly and composited by group for later wet chemistry analyses. Calculated composition of the basal TMR and average composition of the SARA induction diets are presented in Table 2.

Prior to the start of the study, cows were placed on the experimental diet and given access to the buffer blocks for about three days. Buffer block intakes were recorded, and were not significantly different between treatment groups once treatments were assigned.

Table 1 sets forth the data relating to experimental variables at the start of the trial.

TABLE 1

Experimental Variables at Start of Trial

| Item | Control Cows | | | Buffer Block Cows | | | P value for treatment |
|---|---|---|---|---|---|---|---|
| | n | (mean) | (SE) | n | (mean) | (SE) | |
| Days in milk at start of trial | 4 | 180 | 41 | 4 | 162 | 31 | 0.51 |
| Daily milk yield at start of trial, lbs/d | 4 | 62.0 | 3.5 | 4 | 58.8 | 4.0 | 0.51 |
| Mature equivalent milk production, lbs/305 d | 4 | 21778 | 2327 | 4 | 20520 | 1344 | 0.49 |
| Pre-trial TMR intake, lbs DM/d | 4 | 37.4 | 2.1 | 4 | 35.5 | 4.5 | 0.76 |
| Pre-trial buffer block intake, lbs DM/d | 4 | 1.00 | 0.23 | 4 | 0.95 | 0.12 | 0.88 |

As can be seen in Table 1, days in milk, daily milk yield, mature equivalent milk production, daily dry matter intake, and buffer block intake were not different between treatment groups at the start of the trial.

The schedule for each group of cows consisted of a 3-day initial baseline period (days 1-3, without buffer blocks available), a 4-day period to evaluate the response to the buffer blocks (days 4-7, with buffer blocks now available to the treated cows), one day of 50% feed restriction (day 8), a one day of induced SARA (day 9), and a 3-day recovery period (days 10-12).

TABLE 2

Trial Timeline

| | 1 | 2 | 3 | 4 | 5 | 6 | 7 | 8 | 9 | 10 | 11 | 12 |
|---|---|---|---|---|---|---|---|---|---|---|---|---|
| Group 1 Date | 6/3 | 6/4 | 6/5 | 6/6 | 6/7 | 6/8 | 6/9 | 6/10 | 6/11 | 6/12 | 6/13 | 6/14 |
| Group 2 Date | 6/19 | 6/20 | 6/21 | 6/22 | 6/23 | 6/24 | 6/25 | 6/26 | 6/27 | 6/28 | 6/29 | 6/30 |
| Description | No blocks yet Baseline values | | | Blocks added Measure block response | | | | 50% Intake | SARA Chall. | Recovery days Measure recovery | | |

Physical examinations were conducted daily for each cow. Physical examinations were performed every four hours during the SARA induction period (day 9). Physical examination findings were recorded as rectal temperature, pulse rate, respiratory rate, ruminal contraction rate, manure consistency score, and attitude score.

On day 8 for each group, intake was reduced to 50% of each cow's average DMI for days one through seven. The SARA induction diet (basal TMR plus 4.0 kg wheat and barley pellet) was then offered ad libitum on day 9.

Table 3 provides the feed ingredients and calculated nutrient composition of both the basal TMR and SARA induction diets.

TABLE 3

Diet Ingredients

| Feed Ingredient or Nutrient | Basal TMR (% DM) | SARA Induction (% DM) |
|---|---|---|
| Corn silage | 27.01 | 23.18 |
| High moisture shelled corn | 26.27 | 22.54 |
| Alfalfa silage | 22.09 | 18.96 |
| Soy-Plus | 10.09 | 8.66 |
| Whole cottonseed (with lint) | 8.27 | 7.10 |
| Wheat/barley pellet | 3.22 | 16.94 |
| Limestone | 1.44 | 1.23 |
| Energy Booster 100 | 0.56 | 0.48 |
| Salt, Plain White | 0.38 | 0.33 |
| Bloodmeal | 0.33 | 0.28 |
| Dynamate | 0.16 | 0.14 |
| Vitamin-trace mineral pack | 0.09 | 0.08 |
| Magnesium oxide | 0.09 | 0.08 |
| Dry Matter, % of as-fed diet | 57.19 | 60.21 |
| NEL, Mcal/lb DM | 0.78 | 0.80 |
| Ether extract, % DM | 5.3 | 4.8 |
| Crude protein, % DM | 17.5 | 17.1 |
| Acid detergent fiber, % DM | 19.0 | 17.4 |
| Neutral detergent fiber, % DM | 29.1 | 27.2 |

During the SARA induction period (day 9), ruminal fluid was collected every 30 minutes by aspiration through a strainer located next to the pH electrode in the rumen. Ruminal fluid samples were strained through cheesecloth and acidified to 1.0% sulfuric acid (0.2 ml 50% sulfuric acid added to 10 ml of strained fluid) before freezing at −20° C. Ruminal fluid samples were later thawed and analyzed for acetate, propionate, butyrate, 2-3 butanediol, lactate (D plus L isomers), succinate, formate, and ethanol concentrations by high-pressure liquid chromatography.

Feces were collected from the rectum once daily on all days except the SARA challenge day, when feces was collected once each hour. Collections were made manually using a moistened rectal palpation sleeve. Fecal pH was determined by adding approximately 10 cc of feces to 50 ml de-ionized water. After mixing, fecal pH was determined using a pH electrode and hand-held pH meter (calibrated to pH 4 and 7 buffers).

Statistical Analysis: Results of outcomes measured on a daily basis were evaluated using the GLM procedure of SAS. Terms included in the model were group, pair, and treatment.

The ruminal pH area <5.5 is a measure of the time that pH was less than 5.5. The data is actually a measure of the area beneath a representational curve representing an amount that pH has dropped over time. That is, the area represents the amount of time during which the measured pH level was below 5.5.

Data for ruminal pH area <5.5 were square-root transformed prior to statistical analysis. The least-squares means and standard errors for these variables were back-transformed prior to presenting them in the data tables. Significant treatment effects were claimed at $P<0.10$, and treatment tendencies were noted at $P<0.25$.

Cow #614 (a control cow in Group 2) was diagnosed with clinical mastitis on her SARA challenge day (day 9). Her data showed a sharp drop in DMI starting on day 5 and a sharp drop in milk yield starting on day 7. So, all trial level data for this cow were coded as missing after days 1-3; all daily data for dry matter intake were coded as missing after day 5; and all other data (milk yield, ruminal pH, etc.) were coded as missing after day 7. The ruminal pH coil assembly for cow #634 (buffer block treatment, Group 1) malfunctioned until the afternoon of day 9. Readings from this coil assembly had too much variation, even though it did calibrate and validate adequately. All ruminal pH data from this cow were coded as missing prior to the afternoon of day 9.

Cows #468 and #653 also had ruminal pH coil assembly malfunctions. These occurred only on days 1 and 2 for these cows. All daily ruminal pH data from these cows wee coded as missing for these two days. No trial level ruminal pH data were coded as missing for these cows; their baseline period ruminal pH averages were determined from day 3 alone.

Results

Trial-level responses for dry matter intake and milk yield are presented in Table 4.

TABLE 4

Effect of Buffer Block of Present Invention on Dry Matter Intake and Milk Yield

| | Control Cows | | | Buffer Block Cows | | | P value for |
|---|---|---|---|---|---|---|---|
| Item | n | (lsmean) | (SE) | n | (lsmean) | (SE) | treatment |
| Dry matter intake[1]: | | | | | | | |
| Dry matter intake for days 1-3, lbs/d | 4 | 37.2 | 2.7 | 4 | 35.6 | 2.7 | 0.71 |
| Dry matter intake for days 4-7, lbs/d | 3 | 39.5 | 3.1 | 4 | 40.7 | 2.4 | 0.79 |
| Change in dry matter intake after blocks[2], lbs/d | 3 | 0.9 | 1.0 | 4 | 5.1 | 0.8 | 0.08 |
| Dry matter intake on day 9, lbs/d | 3 | 45.9 | 4.9 | 4 | 45.3 | 3.8 | 0.93 |

TABLE 4-continued

Effect of Buffer Block of Present Invention on
Dry Matter Intake and Milk Yield

| Item | Control Cows | | | Buffer Block Cows | | | P value for treatment |
|---|---|---|---|---|---|---|---|
| | n | (lsmean) | (SE) | n | (lsmean) | (SE) | |
| Change in dry matter intake after SARA challenge[3], lbs/d | 3 | 6.4 | 3.5 | 4 | 4.6 | 2.7 | 0.72 |
| Dry matter intake for days 10-11, lbs/d | 3 | 38.3 | 3.2 | 4 | 39.4 | 2.5 | 0.80 |
| Change in dry matter intake from SARA challenge[3], lbs/d | 3 | −1.3 | 3.1 | 4 | −1.3 | 2.4 | 0.99 |
| Milk yield: | | | | | | | |
| Milk yield for days 1-3, lbs/d | 4 | 65.7 | 3.7 | 4 | 60.0 | 3.7 | 0.36 |
| Milk yield for days 4-7, lbs/d | 3 | 65.7 | 5.8 | 4 | 61.0 | 4.5 | 0.59 |
| Change in milk yield after blocks[2], lbs/d | 3 | −1.1 | 0.2 | 4 | 1.1 | 0.1 | <0.01 |
| Milk yield on day 9, lbs/d | 3 | 50.7 | 3.0 | 4 | 50.0 | 2.4 | 0.89 |
| Change in milk yield after SARA challenge[3], lbs/d | 3 | −15.0 | 3.0 | 4 | −11.0 | 2.4 | 0.41 |
| Milk yield for days 10-11, lbs/d | 3 | 59.2 | 3.8 | 4 | 57.4 | 2.9 | 0.74 |
| Change in milk yield from SARA challenge[3], lbs/d | 3 | −6.5 | 3.3 | 4 | −3.7 | 2.6 | 0.57 |

[1]Dry matter intakes are for intake from both the TMR and from the buffer block.
[2]Compares days 4 through 7 (after blocks introduced) to days 1 through 3 (before blocks introduced).
[3]SARA challenge = Subacute ruminal acidosis challenge; compares days 10 and 11 (first two recovery days) to days 4 through 7 (before the challenge).

Buffer block consumption caused an increase in dry matter intake. After introduction to the buffer block prior to Day 4, the daily dry matter intake for cows consuming the buffer blocks increased by 5.1 lbs. per day, from 35.6 to 40.7 lbs./day. In contrast, the daily dry matter intake for the control cows only increased by 0.9 lbs per day, from 37.2 to 39.5 lbs/day. Though the block intake (about 1.0 lb.) is included in this difference, it still demonstrates approximately 3.0 lbs. or nearly a 9.0% increase in dry feed intake excluding block consumption.

Figure 2:
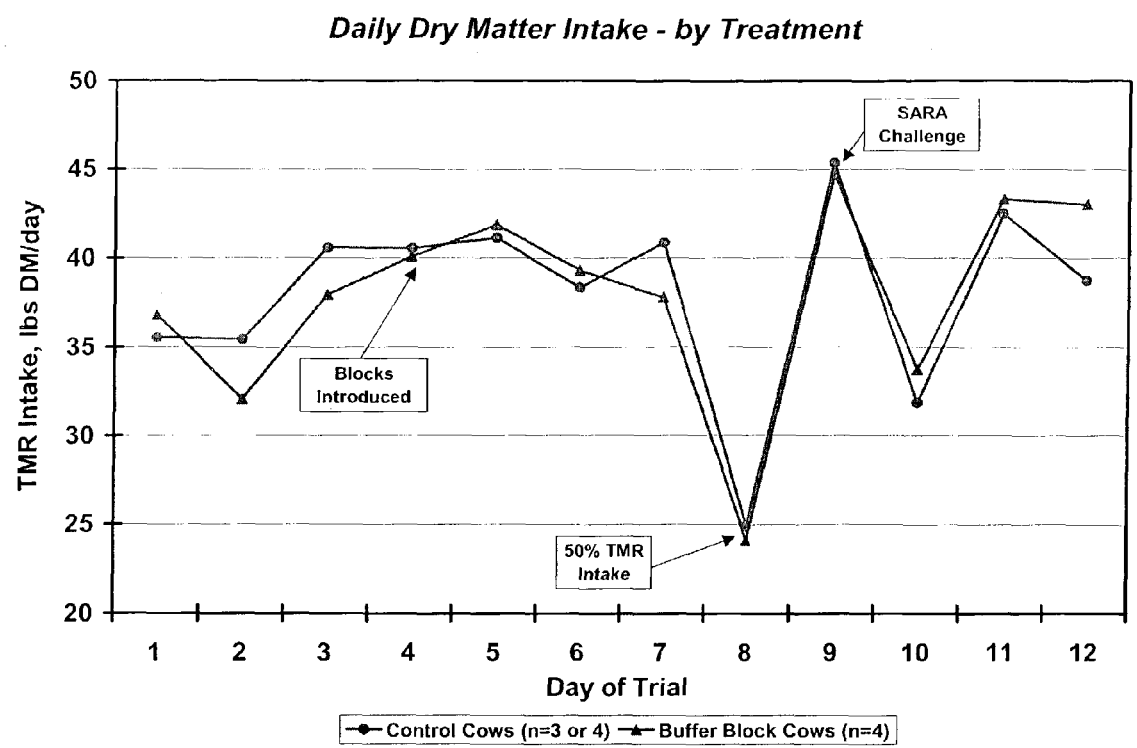

The higher intake for cows on the buffer block of the present invention is also depicted in FIG. 2. Note that the amount of dry matter consumed per day by the buffer block cows jumps above the amount consumed by the control cows after introduction of the buffer block. Further, the buffer block cows also exhibit greater dry matter intake than the control cows after the SARA challenge.

Low-moisture block intake patterns over the course of the study, depicted in FIG. 1, were within expected values. As cows are first exposed to these palatable blocks, the novelty will often times result in a first day with higher than normal intake, followed by more typical consumption levels in the days that follow as animals become acclimated to the presence of a block. Note that daily intake dropped between day 4, when the blocks were introduced, and day 6. When the cows were subjected to the 50% reduction in feed intake, they compensated by licking and consuming a higher amount of the low-moisture block once they ran out of dry feed in their bunk. As cows were then offered feed to appetite satisfaction, the block intakes fell back into expected values again at the end of the study. These consumption patterns would be what is expected during normal feeding events under typical modern dairy production conditions.

Block intakes did not increase during the SARA challenge period. Relatively low buffer block intake on the SARA challenge day suggests that the cows did not consume more buffer block in response to low ruminal pH. Instead, it appeared that the cows simply ate less total feed when ruminal pH was low.

Buffer block consumption also caused an increase in milk yield. After buffer block introduction, the daily milk yield for cows consuming the buffer blocks increased by 1.1 lb. per day (note that the data is present in "least-square mean" form, so while the numbers presented in the table may not seem to be reconcilable, they are statistically weighted to account for variation from factors other than the treatments). In contrast, daily milk yield for control cows fell by 1.1 pounds per day over the same period. This change of 2.2 pounds or approximately 4% was established with primiparous dairy cows that were from 162 to 180 days in milk at the start of the study. Previous work with primiparous and multiparous dairy cows demonstrated a 5.1 pound or a 6% increase in milk production when both parities were combined. If the multiparous cows were analyzed separately in the same trial, the cows that consumed a low-moisture block produced 9.2 pounds or 12.4% more milk than cows that did not have access to a low-moisture block. The effectiveness of the low moisture block of the present invention to increase milk production appears to have the most impact on higher producing dairy cows with increased dietary intakes.

Trial-level responses for ruminal pH are presented in Table 5.

TABLE 5

Effect of Buffer Block of Present Invention on Ruminal pH Responses

| Item | 3. Control Cows | | | Buffer Block Cows | | | P value for treatment |
|---|---|---|---|---|---|---|---|
| | n | (lsmean) | (SE) | n | (lsmean) | (SE) | |
| Daily Mean Ruininal pH: | | | | | | | |
| Mean ruminal pH for days 1-3 | 4 | 6.08 | 0.09 | 3 | 6.22 | 0.11 | 0.42 |
| Mean ruminal pH for days 4-7 | 3 | 6.24 | 0.24 | 3 | 6.21 | 0.24 | 0.95 |
| Change in mean ruminal pH after blocks[1] | 3 | 0.14 | 0.08 | 3 | −0.01 | 0.08 | 0.43 |
| Mean ruminal pH on day 9 | 3 | 5.66 | 0.34 | 3 | 5.72 | 0.34 | 0.93 |
| Change in mean ruminal pH after SARA challenge[2] | 3 | −0.58 | 0.11 | 3 | −0.49 | 0.11 | 0.67 |
| Mean ruminal pH for days 10-11 | 3 | 5.96 | 0.23 | 4 | 6.29 | 0.18 | 0.38 |
| Change in mean ruminal pH from SARA challenge[2] | 3 | −0.26 | 0.09 | 3 | 0.04 | 0.09 | 0.28 |
| Daily Area <5.5[3]: | | | | | | | |
| Area <5.5 for days 1-3, .1pH*min | 4 | 138 | 54 | 3 | 100 | 90 | 0.90 |
| Area <5.5 for days 4-7, .1pH*min | 3 | 19 | 350 | 3 | 157 | 350 | 0.82 |
| Change in area <5.5 after blocks[1], .1pH*min | 3 | −1 | 79 | 3 | 0 | 79 | 0.93 |
| Ruminal pH area <5.5 on day 9, .1pH*min | 3 | 1745 | 258 | 3 | 1555 | 258 | 0.94 |
| Change in ruminal pH area <5.5 after SARA challenge[2], .1pH*min | 3 | 1397 | 7 | 3 | 724 | 7 | 0.23 |
| Area <5.5 for days 10-11, .1pH*min | 3 | 211 | 95 | 4 | 7 | 57 | 0.44 |
| Change in area <5.5 from SARA challenge[2], .1pH*min | 3 | 135 | 40 | 3 | −202 | 40 | 0.23 |

[1]Compares days 4 through 7 (after blocks introduced) to days 1 through 3 (before blocks introduced).
[2]SARA challenge = Subacute ruminal acidosis challenge; compares days 10 and 11 (first two recovery days) to days 4 through 7 (before the challenge).
[3]The statistical analysis for treatment effect on ruminal pH area <5.5 was conducted on square root transformed data. The least-squares means and standard errors are back-transformed from the square root transformed results.

Buffer block consumption had a beneficial effect on ruminal pH. The key study outcome (change in ruminal pH area less than 5.5 after the SARA challenge) tended to be lower for the cows consuming the buffer blocks (P=0.23). That is, the cows that were fed the buffer blocks experienced a ruminal pH below 5.5 for less time than the control cows.

While the ruminal pH characteristics appeared to be improved numerically as a result of the buffer block, these improvements were not statistically significant, as evidenced by the fact that the P values set forth in Table 5 were greater than 0.10 for all the data. Not to be limited by theory, it is thought that perhaps the significance threshold was not met in part because of (1) the small number of test animals, (2) equipment failure, and (3) loss of data in the study.

Figure 3:
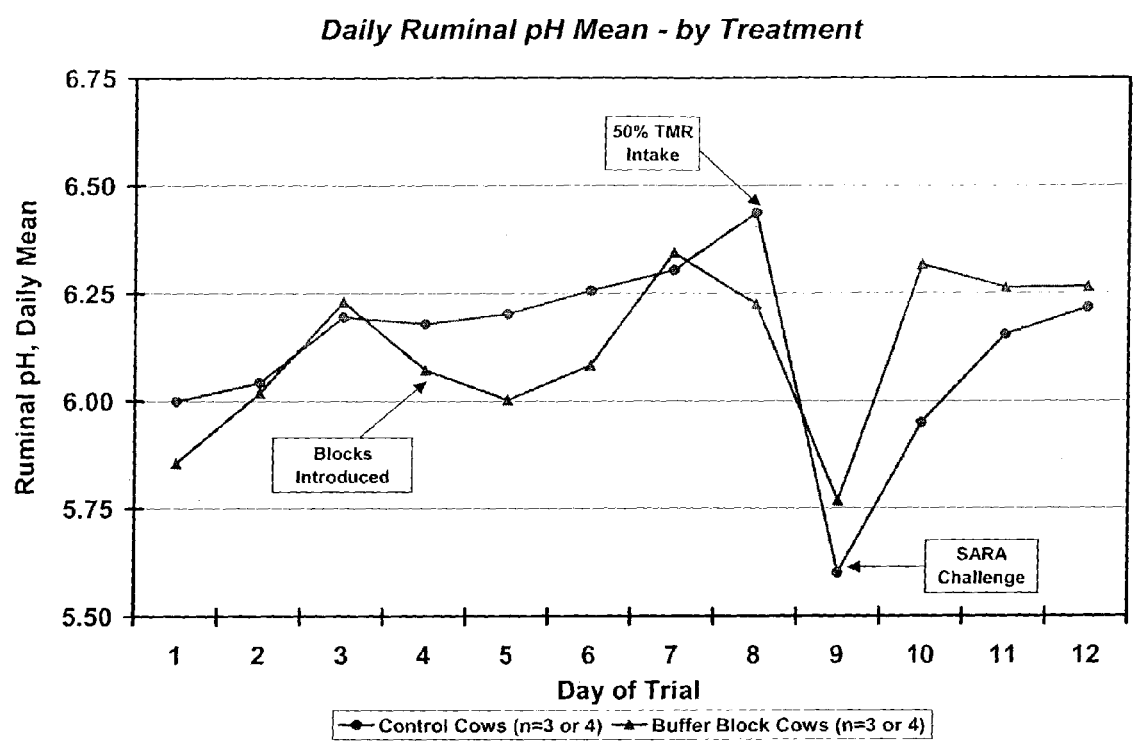

FIG. 3 depicts the benefits of the buffer block of the present invention on ruminal pH, including the stabilizing effect that the block has on pH levels. When SARA was induced on day 9, ruminal pH of the buffer block cows did not drop as low as that of the control cows. Further, the pH levels of the buffer block cows recovered much more quickly than those of the control cows after SARA, as evidenced by the higher pH levels for the buffer block cows on days 10, 11, and 12.

Figure 4:
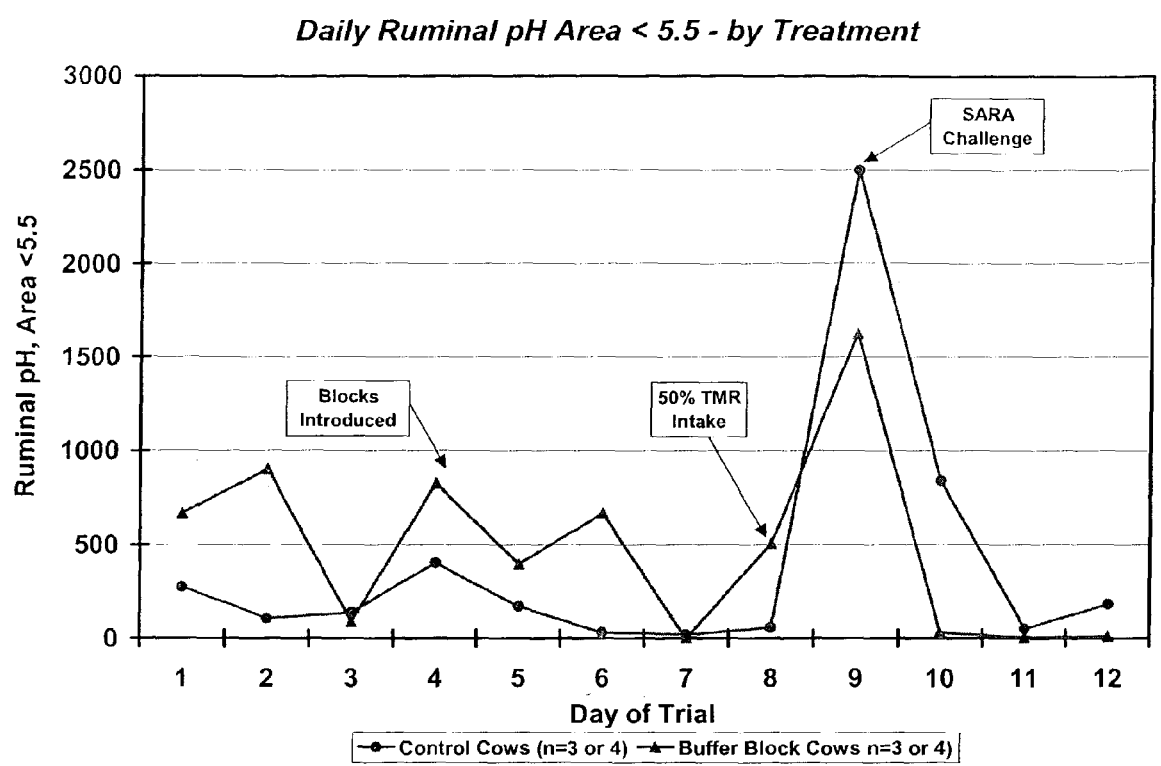

FIG. 4 further emphasizes the benefits of the present invention for ruminal pH. FIG. 4 depicts the daily ruminal pH area <5.5. As discussed above, ruminal pH is expected to decrease with an increase in feed intake as there is more fermentable substrate available. FIG. 4 reflects that expectation, because low-moisture block cows responded with an increase in feed intake when buffer blocks were provided, and therefore may have initially experienced more time when rumen pH was lowered. However, once the cows were restricted in feed intake and then subjected to the SARA challenge with a "slug" of highly fermentable carbohydrate, low-moisture block cows appeared to handle the insult much better by responding with much less time below a pH of 5.5.

CONCLUSIONS

Without being limited by theory, it is suggested that by feeding a low-moisture block, the rumen microflora may be conditioned or microflora population changes may take place for animals to better respond when exposed to ruminal acidosis. Some of these changes are probably occurring with lactate-utilizing microbes whereby the propogation of these acid-clearing bacteria can assist with preventing severe drops in pH and subsequent deterioration of the rumen environment for livestock at risk of acidosis.

Figure 5:
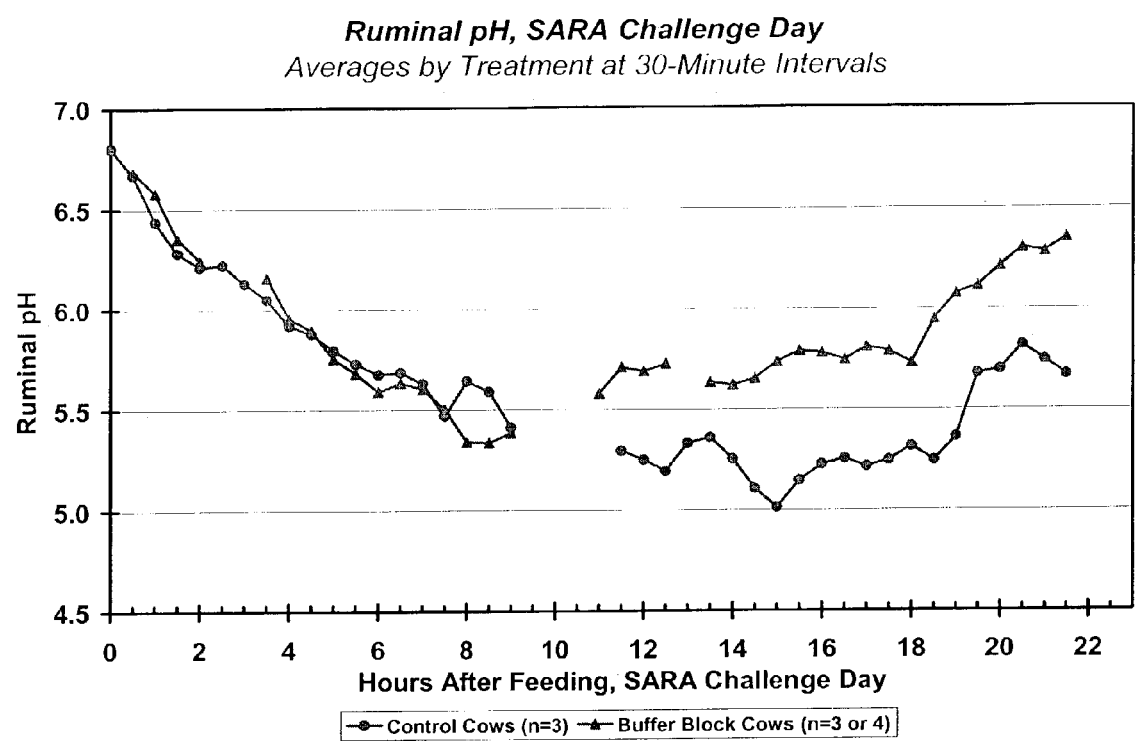

The benefits are substantiated further by a daily comparison of ruminal pH on the day of the SARA challenge, as depicted in FIG. 5. Immediately after the cows were allowed access to feed, ruminal pH dropped at a similar rate for both the buffer block and the control cows for the $1^{st}$ 8 to 9 hours. After this period, however, a clear separation in ruminal pH is demonstrated between low-moisture block cows and control cows. A substantial amount of time was spent by the control cows below a ruminal pH of 5.5, the level below which SARA occurs. The buffer block cows rebounded from the drop in pH more rapidly, with their pH values in a much more favorable range for rumen fermentation, fiber digestion, desirable fermentation end products, milk constituents, and overall animal health. These data suggest that cows fed low-moisture molasses blocks may be able to better respond to metabolic insults—whether the insults are diet induced, management induced, weather related, equipment related, or simply human error—that would otherwise expose them to periods of SARA.

The information and examples described herein are for illustrative purposes and are not meant to exclude any derivations or alternative methods that are within the conceptual context of the invention. It is contemplated that various deviations can be made to this embodiment without deviating from the scope of the present invention. Accordingly, it is intended that the scope of the present invention be dictated by the appended claims rather than by the foregoing description of this embodiment.

We claim:

1. A method of maintaining a healthy rumen in a ruminant comprising:

providing a low-moisture block for the ruminant comprising a buffer in a palatable base ingredient block matrix, wherein the buffer comprises at least one of sodium bicarbonate, sodium sesquicarbonate, potassium carbonate, magnesium oxide, magnesium hydroxide or magnesium carbonate, wherein the base ingredient comprises at least one of molasses taffy, molasses, concentrated separator byproduct, or soluble molasses solids, wherein the buffer is present in a concentration ranging from about 20 percent to about 50 percent by weight of the block, and wherein the base ingredient comprises from about 30 percent to about 70 percent by weight of the block;

dehydrating the low-moisture block to be hygroscopic by heating applied to the base ingredient before mixing with the buffer; and allowing the ruminant free choice when in or subject to ruminal acidosis to lick and remove exposed portions of the block, with slow softening of the exposed portions stimulating ruminant salivation and providing the primary consumption limitation.

2. The method of claim 1, wherein the step of providing the low-moisture block for the ruminant occurs during periods of heat stress.

3. The method of claim 1 wherein the buffer is present in a concentration of from about 35 percent to about 45 percent by weight of the block.

4. The method of claim 1, wherein the ruminant is a bovine.

5. The method of claim 4, wherein the bovine is a dairy cow.

6. The method of claim 4, wherein the bovine is intended for meat consumption.

7. The method of claim 1, wherein the ruminant is a goat or a sheep.

* * * * *